United States Patent
Blair

(10) Patent No.: US 9,675,055 B2
(45) Date of Patent: Jun. 13, 2017

(54) FISHING TACKLE DEVICES AND METHODS OF MANUFACTURING SAME

(71) Applicant: David Oman Blair, Orem, UT (US)

(72) Inventor: David Oman Blair, Orem, UT (US)

(*) Notice: Subject to any disclaimer, the term of this patent is extended or adjusted under 35 U.S.C. 154(b) by 87 days.

(21) Appl. No.: 14/483,101

(22) Filed: Sep. 10, 2014

(65) Prior Publication Data

US 2015/0216154 A1 Aug. 6, 2015

Related U.S. Application Data

(60) Provisional application No. 61/936,803, filed on Feb. 6, 2014.

(51) Int. Cl.
*A01K 85/00* (2006.01)
*A01K 85/08* (2006.01)
*A01K 85/16* (2006.01)

(52) U.S. Cl.
CPC ............ *A01K 85/005* (2013.01); *A01K 85/08* (2013.01); *A01K 85/16* (2013.01)

(58) Field of Classification Search
CPC ........ A01K 85/00; A01K 85/08; A01K 85/16; A01K 85/005
USPC .............................................. 43/42.05, 42.36
See application file for complete search history.

(56) References Cited

U.S. PATENT DOCUMENTS

| | | | | |
|---|---|---|---|---|
| 3,108,390 A | * | 10/1963 | Knight | A01K 85/16 43/42.09 |
| 3,867,781 A | * | 2/1975 | Wolfe | A01K 85/00 43/42.05 |
| 4,037,346 A | | 7/1977 | Holst | |
| 4,617,753 A | * | 10/1986 | Pauley et al. | A01K 85/10 43/42.09 |
| 5,129,175 A | * | 7/1992 | Pixton | A01K 85/00 43/42.24 |
| 5,144,765 A | * | 9/1992 | Keeton | A01K 85/01 43/42.31 |
| 5,172,510 A | * | 12/1992 | Lovell, Jr. | A01K 85/01 43/42.06 |
| 5,915,945 A | | 6/1999 | Malone | |
| 6,571,508 B2 | * | 6/2003 | Brinkman | A01K 83/06 43/4.5 |
| 7,526,891 B2 | | 5/2009 | Barber et al. | |
| 2012/0285069 A1 | | 11/2012 | Baumgardner et al. | |

* cited by examiner

*Primary Examiner* — Cassandra Davis

(57) ABSTRACT

Tackle or artificial fly devices for improved fishing experience. The tackle device includes head and tail portions formed of a single, continuous material and allows one to tie flies thereon without fixing a certain hook type and/or size directly to the device. A lumen extends the device length and enables the tackle device to slide freely along a fishing line and more easily release from junction tubing and/or a fishing hook when a fish strikes. The tackle device can consist of a plastic, polycarbonate or other rigid polymer formed via injection molding. Device head portions can include cylindrical, dome as well as segmented shapes; various sizes; and one or more bills, cavities and/or carve-outs to create desired motion of the device while fishing. Incorporating draft into the tail portion further facilitates separation from junction tubing when hooking a fish, thereby prolonging the useful life of the tackle device.

17 Claims, 13 Drawing Sheets

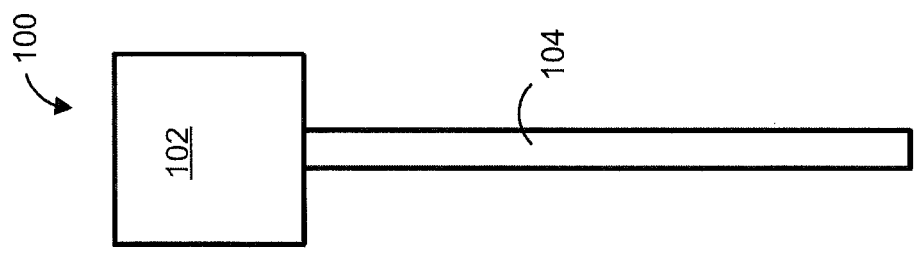
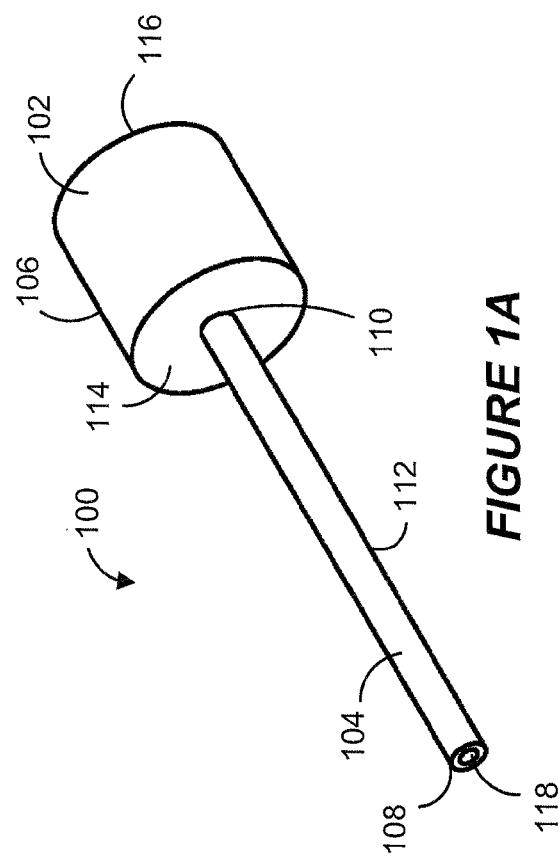
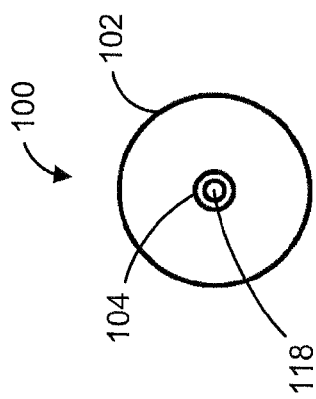

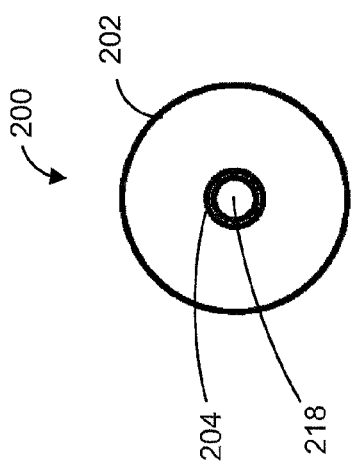
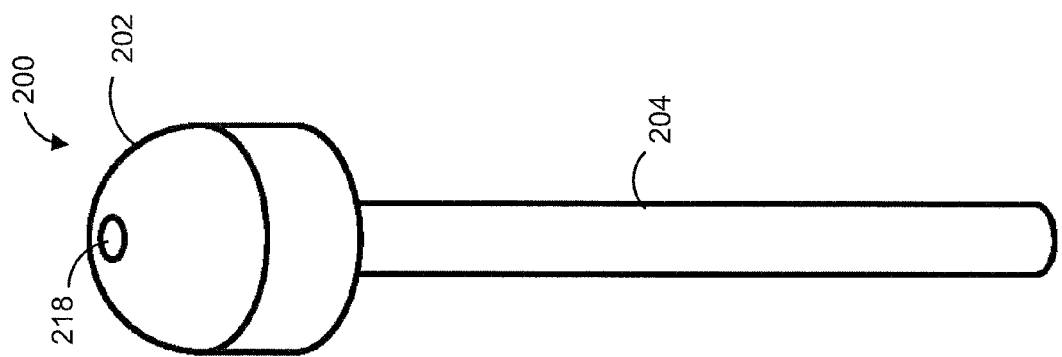

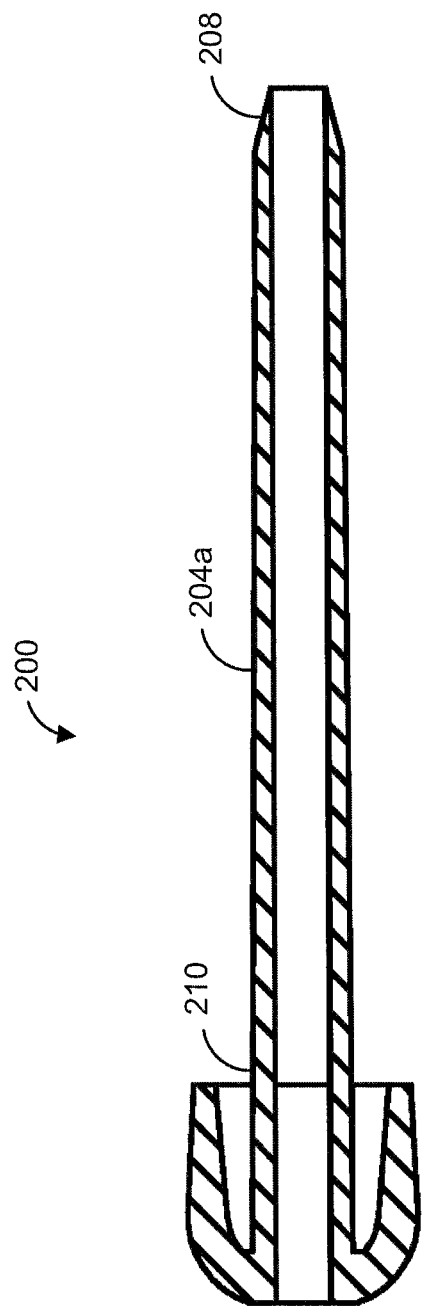

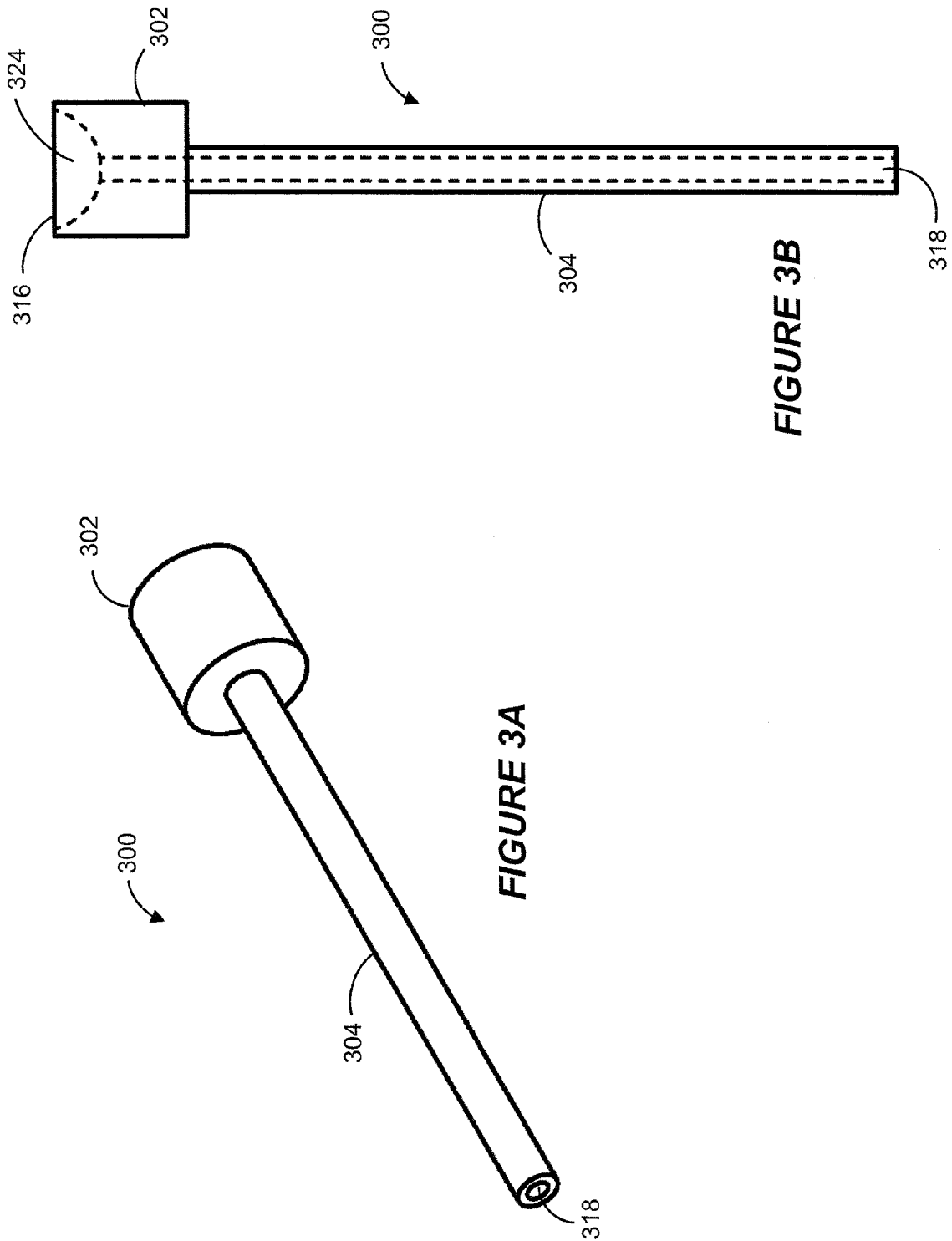

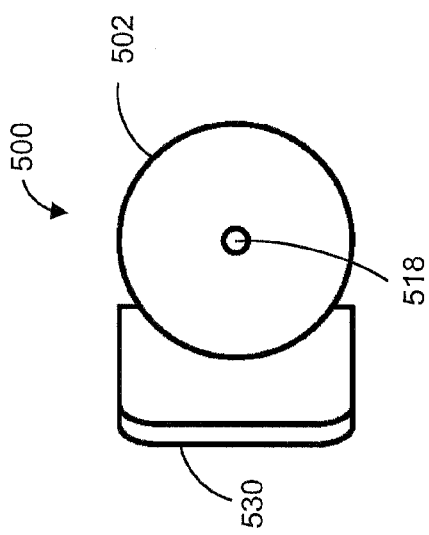
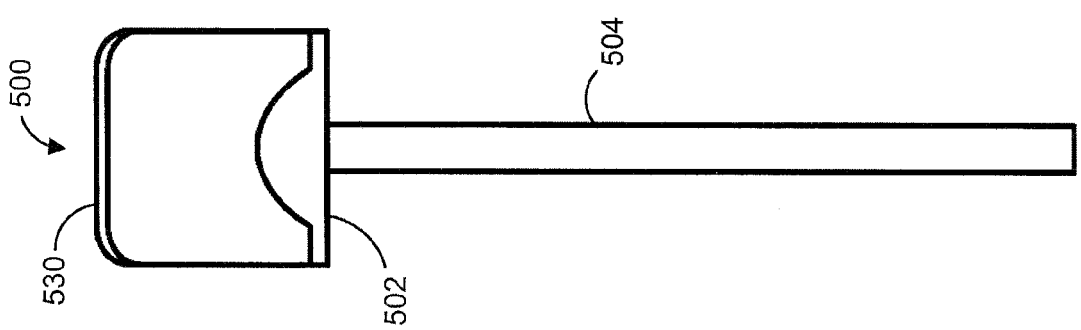

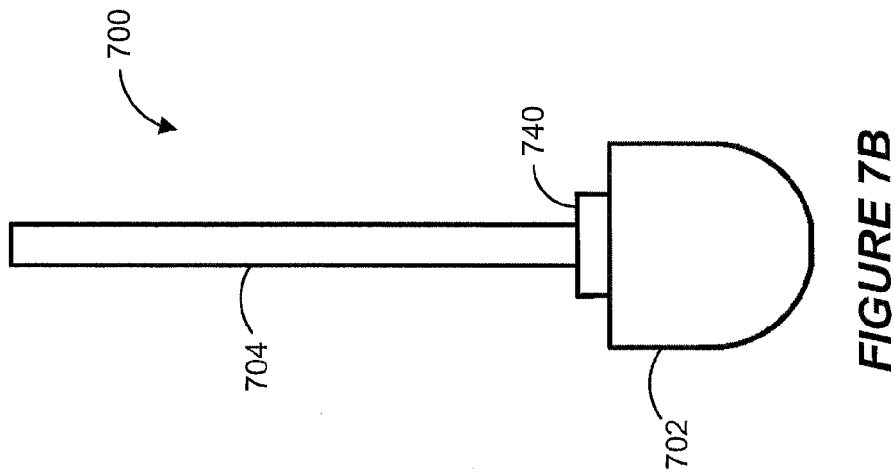
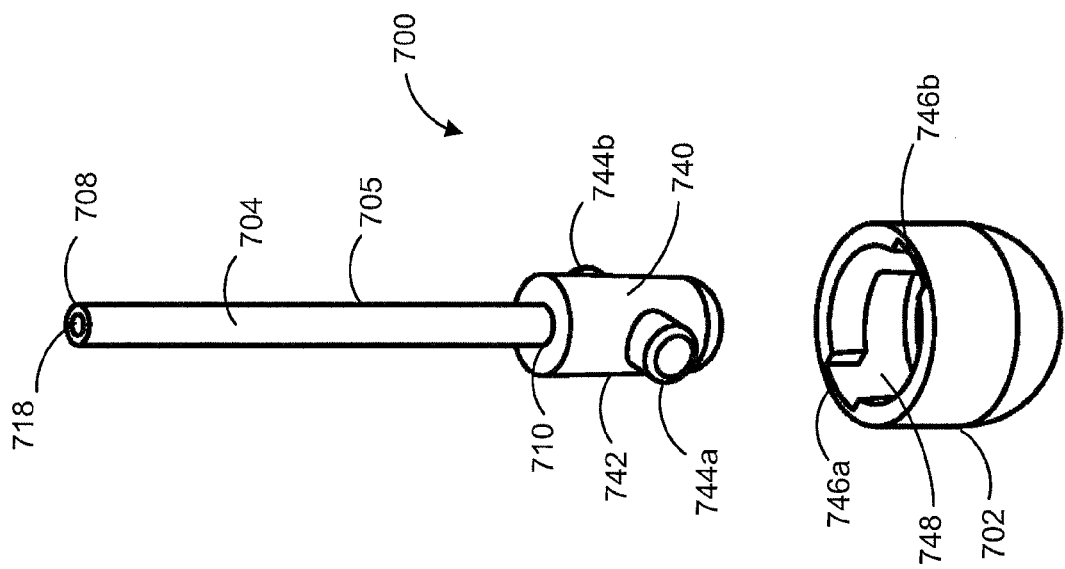
FIGURE 7B
FIGURE 7A

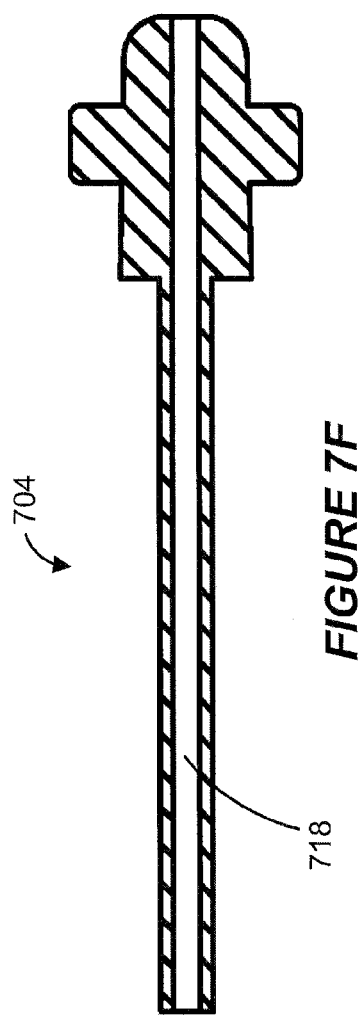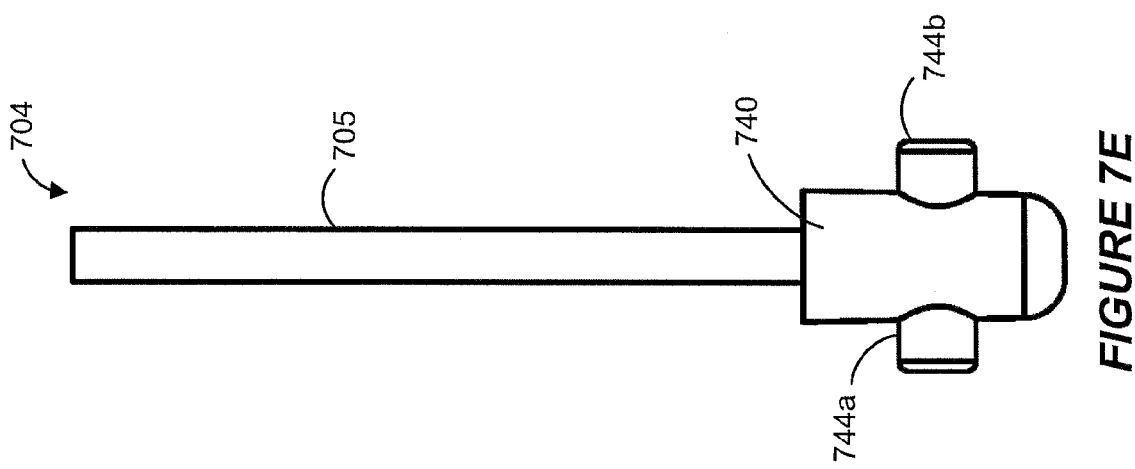

FISHING TACKLE DEVICES AND METHODS OF MANUFACTURING SAME

RELATED APPLICATION

The present application claims the benefit of priority under 35 U.S.C. §119(e) from U.S. Provisional Application No. 61/936,803, filed Feb. 6, 2014, and entitled "FISHING TACKLE DEVICE AND METHOD OF MANUFACTURING SAME," the entirety of which is hereby incorporated herein by reference to be considered part of this specification.

BACKGROUND

Field

The present disclosure relates to fishing tackle devices and methods of manufacturing the same and, in particular, to an improved device for use with an artificial fly and/or lure.

Description of the Related Art

Conventional artificial flies are tied and/or formed directly on a fishhook such that the hook becomes an integral part of the fly. With this configuration comes several drawbacks. For example, such artificial flies are permanently limited to the fixed size, bend, type, model and gape of their associated hooks, thereby shortening their lifespan and limiting their scope of use. Hooks can also become dull, rusty or otherwise ineffective, prematurely shortening the useful life of the entire fly since the hook can no longer set into a fish's mouth, rendering the fly useless as a means of taking fish.

Furthermore, preparation of conventional large flies can often include the use of epoxies to form "heads" on the hook or fly. These epoxies can take hours to spin and cure, thereby introducing a higher probability that errors or inconsistencies will develop in the heads and substantially delaying the precious time before the artificial fly can even be used. Epoxies can also yellow, crack or develop other defects over time, again shortening the effective life of the entire fly. Even when catching a fish, the fly, when formed on the hook, is often swallowed by the fish and deteriorates after only a few uses.

In addition to the above, conventional flies are not easily interchangeable and can be fairly fragile. These and other drawbacks introduce inconsistencies and increased costs to the fishing experience.

SUMMARY

In view of the foregoing, a need exists for improved fishing tackle devices and methods for manufacturing the same. Certain embodiments of the invention provide for fishing tackle devices that allow a fisherman to tie flies thereon without attaching the device directly to a hook. This allows the fisherman to easily switch out hooks and/or artificial fly devices to suit his/her particular needs (e.g., hook size and type) or to target specific species and/or size of fish. Embodiments of the invention also provide a fishing tackle device advantageously having an integral, pre-formed head, or fore, portion, thereby substantially shortening fly preparation time and reducing the chance for inconsistencies to develop in the device.

Embodiments of the invention offer alternatives to traditional artificial flies or fly lures commonly used in fishing. For instance, simplified tackle devices may be easily threaded onto fishing lines without attaching the device to other fishing elements, such as a hook, junction tube, combinations of the same or the like. The devices can also be easily molded and mass-produced to decrease manufacturing costs and time.

In certain embodiments, a fishing tackle device, or tubular fly device, includes a tubular and/or elongated aft, or tail, portion and a larger fore, or head, portion (e.g., in the shape of a cylinder, dome, cone, combinations of the same or the like), wherein a hollow center or conduit extends longitudinally throughout the length of the tail and head portions of the device. The tackle device is structured to support an artificial fly (or other imitating element(s)) tied or affixed thereon and to be threaded on a fishing line (the line extending through the hollow center) without attaching the device directly to a hook or the line. Thus, when a fish hits the device, the fishing tackle device (with the fly) can naturally release and conveniently slide up the fishing line, due to the drag of the water, without being swallowed by the fish.

The fishing tackle device can further include bills, eyes, tails, feet, hair, fins, cavities and/or other elements to mimic a fly, baitfish, other insect or item to be perceived as food by a fish. In certain embodiments, the fishing tackle device is advantageously constructed of a unitary, consistent material to simplify manufacturing and to maintain consistency between flies (e.g., same functions, appearance and actions while fishing).

In certain embodiments, an artificial fly device is disclosed having a tail portion, a head portion and a lumen extending therethough. The tail portion has an elongated tubular shape with a proximal end, a distal end, and an outside surface having a substantially circular first cross-section with a first diameter. The head portion has a first end permanently joined with the proximal end of the tail portion, a second end opposite the first end and an outside surface having a substantially circular second cross-section with a second diameter, the second diameter being longer than the first diameter. The lumen is configured to receive a fishing line and is substantially centered in the head and tail portions, extending longitudinally from the distal end of the tail portion to the second end of the head portion and having a length of between one inch and five inches. In further embodiments, both the head and tail portions are advantageously free from any hooks affixed thereto, and the device consists entirely of a single polycarbonate material. In yet further embodiments, the head portion may include one or more cavities, fins and/or grooves.

In other embodiments, a fishing tackle device is disclosed with an elongated tail portion, a head portion and a cylindrical lumen. The tail portion has a proximal end with a first diameter and a distal end with a second diameter, the second diameter being shorter than the first diameter. The head portion is permanently fused with the proximal end of the tail portion and has a substantially cylindrical cross-section with a third diameter, the third diameter being at least twice as long as the first diameter. The cylindrical lumen is substantially centered in the head portion and the tail portion and extends longitudinally therethrough. The tail and head portions are formed entirely of a single non-porous polymer material, such as, for example, a rigid material and/or a high-viscosity polycarbonate.

In yet other embodiments, a hookless artificial fishing device is disclosed having: an elongated tail portion with proximal and distal ends; a head portion connected to the proximal end of the tail portion, wherein the head portion has a substantially cylindrical cross-section; and a cylindrical lumen substantially centered in the head and tail portions and extending longitudinally therethrough. In certain configurations, the tail and head portions consist only and entirely of a single, rigid plastic material.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 1A illustrates a perspective view of a fishing tackle device according to certain embodiments of the invention.

FIG. 1B illustrates a side view of the fishing tackle device of FIG. 1A.

FIG. 1C illustrates a bottom plan view of the fishing tackle device of FIG. 1A.

FIG. 2A illustrates a perspective view of another embodiment of a fishing tackle device having a domed head.

FIG. 2B illustrates a bottom plan view of the fishing tackle device of FIG. 2A.

FIG. 2E illustrates a longitudinal cross-sectional view of another embodiment of the fishing tackle device having draft incorporated therein.

FIG. 3A illustrates a perspective view of another embodiment of a fishing tackle device.

FIG. 3B illustrates a side view of the fishing tackle device of FIG. 3A having a head with a concave carve-out.

FIG. 5C illustrates a rear view of the fishing tackle device of FIG. 5A.

FIG. 5D illustrates a top plan view of the fishing tackle device of FIG. 5A.

FIG. 7A illustrates a perspective, exploded view of a fishing tackle assembly according to certain embodiments of the invention.

FIG. 7B illustrates a side view of the fishing tackle assembly of FIG. 7A.

FIG. 7E illustrates a side view of an embodiment of an insert or tail portion of the fishing tackle assembly of FIG. 7A.

FIG. 7F illustrates a side cross-sectional view of an embodiment of the tail portion of FIG. 7E.

DETAILED DESCRIPTION OF THE EMBODIMENTS

Figure 2D:
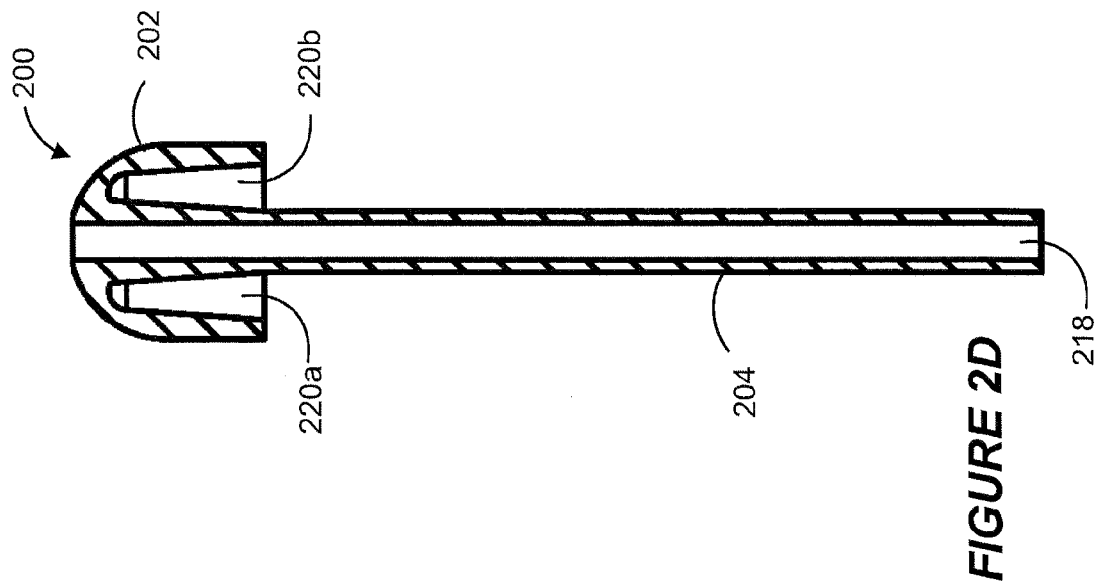
FIG. 2D illustrates a longitudinal cross-sectional view of an embodiment of the fishing tackle device of FIG. 2A.

As will be seen from the disclosure herein, certain embodiments of fishing tackle, or fly, devices and methods of manufacturing are provided for an improved fishing experience. In particular, embodiments of the invention include tackle devices that are formed or molded from a single material, such as plastic, and are easily interchangeable with hooks, weights or other fishing elements to target different species and/or sizes of fish. Moreover, certain embodiments of the fishing tackle devices described herein offer alternatives to, and/or replacements for, conventional artificial flies, which generally have a short useful life. The tackle devices can be formed with various heads, shapes, sizes and/or features to customize and improve the fishing experience.

For example, various fishing tackle devices will be described herein that allow a user and/or machine to attach, build, manufacture or create an artificial fly or lure using said device to participate in the act of fishing or lure/fly making. In particular, on fore (or head) and/or aft (or tail) portions of the tackle device, a user can tie and/or create a fly as is generally performed in the industry. In using the tackle device, the user threads a fishing line through a hollow center or conduit of the device and secures, preferably proximate (but not on) the tail portion of the device a hook, leader or other fishing equipment. In preferred embodiments, the tackle device is substantially free to slide along the fishing line during operation. In yet other embodiments, a hook may be secured directly to the tackle device.

In certain embodiments, an artificial fly device is disclosed having a tail, a head and a lumen extending therethough, with the artificial fly being void of any hooks, rings, weights or other fishing elements. The tail has an elongated tubular shape with a proximal end, a distal end, and an outside surface having a substantially circular cross-section. The head has a first end permanently joined with the proximal end of the tail, a second end opposite the first end and an outside surface having a substantially circular cross-section that is larger than the cross-section of the tail. The lumen is configured to receive a fishing line and is substantially centered in the device, extending longitudinally from the distal end of the tail to the second end of the head and having a length of between one inch and five inches. In further embodiments, the device consists entirely of a single polycarbonate material. In yet further embodiments, the head may include one or more cavities, fins and/or grooves.

In other embodiments, a fishing tackle device is disclosed with an elongated tail, a head and a cylindrical lumen. The tail has a proximal end with a first diameter and a distal end with a second diameter, the second diameter being shorter than the first diameter. In certain configurations, the second diameter is between one percent (1%) and five percent (5%) shorter than the first diameter. The head is permanently fused with the proximal end of the tail and has a substantially cylindrical cross-section with a third diameter, the third diameter being at least twice as long as the first diameter. The cylindrical lumen is substantially centered in the head portion and the tail portion and extends longitudinally therethrough. The tail and head portions are formed entirely of a single non-porous polymer material, such as, for example, a rigid material and/or a high-viscosity polycarbonate.

In yet other embodiments, a hookless artificial fishing device is disclosed having: an elongated tail with proximal and distal ends; a head with a substantially cylindrical cross-section and connected to the proximal end of the tail; and a cylindrical lumen substantially centered in, and extending through, the head and tail. In certain configurations, the tail and head consist only and entirely of a single, rigid plastic material.

The features of the devices and methods will now be described with reference to the drawings summarized above for a thorough understanding of, and enabling description for, the embodiments of the inventions. Throughout the drawings, reference numbers are re-used to indicate correspondence between referenced elements. The drawings, associated descriptions, and specific implementation are provided to illustrate embodiments of the invention and not to limit the scope of the disclosure. One skilled in the art will understand that embodiments of the invention may be practiced without all the described details. In other instances, well-known structures and functions have not been shown or described in detail to avoid unnecessarily obscuring the description of the embodiments of the invention.

The terminology used in the description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this disclosure.

Moreover, the disclosure and/or drawings may include or suggest dimension, size, angle, scale, tolerance or like information specific to certain embodiments of the invention. Such information is included for example purposes and is not intended as limiting to embodiments of the invention. Rather, those with skill in the relevant art will understand from the disclosure herein that other embodiments of the invention can include different size(s), angle(s), scale(s), tolerance(s), combinations of the same or the like.

FIGS. 1A through 1C illustrate a fishing tackle device according to certain embodiments of the invention. As will be shown, the fishing tackle device is advantageously designed to be threaded, but not attached, onto a fishing line for use during fishing. Such a design allows for the tackle device to be easily interchanged, matched with various types of hooks and/or other fishing elements, evade being swallowed by fish, expedite preparing time for fishing, combinations of the same and the like.

In particular, FIG. 1A illustrates a perspective view of a fishing tackle device 100. As shown, the device 100 comprises a fore, or head, portion 102 and an aft, or tail, portion 104. The illustrated head portion 102 comprises a substantially cylindrical shape having an outer surface 106 with a substantially circular transverse section (i.e., a cross-section at a right angle to an axis of the cylindrical head portion 102). In certain embodiments, the head portion 102 is formed and sized for a fisherman to tie and/or affix additional fly elements thereon.

The tail portion 104 comprises a substantially elongated, tubular shape having a distal end 108, a proximal end 110 and an outer surface 112. As shown, the outer surface 112 of the tail portion 104 has a substantially circular transverse section (or cross-section). In certain preferred embodiments, the circumference of the outer surface 112 of the tail portion 104 is smaller than the circumference of the outer surface 106 of the head portion 102 (i.e., the diameter of the cross-section of the head portion 102 is longer than the diameter of the cross-section of the tail portion 104) to mimic the shape of an insect moving through or on water. For example, in certain embodiments, the diameter of the head portion 102 can be at least twice as long as the diameter of the tail portion 104.

As illustrated, the proximal end 110 of the tail portion 104 is connected to a first end 114 of the head portion 102. In certain embodiments, the tail portion 104 is permanently joined, fused, integrated, attached or molded to the head portion 102 such that the fishing tackle device 100 comprises a single, continuous (integral) piece of material, as is discussed in more detail below.

A conduit, or lumen, 118 extends through the head portion 102 and the tail portion 104. In preferred embodiments, the lumen 118 extends longitudinally from the distal end 108 of the tail portion 104 to a second end 116 of the head portion 102, the lumen 118 being substantially centered within the head portion 102 and the tail portion 104. In certain embodiments, the lumen 118 maintains substantially the same shape and size as it extends through the device 100 to advantageously allow the device 100 to slide substantially unrestricted along a fishing line threaded therethrough.

Although the device 100 has been described as having a single, uniform lumen 118, a skilled artisan will recognize from the disclosure herein that each of the head and tail portions 102, 104 may have distinct cylindrical hollow centers, or lumens, having the same diameter or different diameters that are substantially aligned. That is, the head portion 102 and the tail portion 104 can be arranged, formed and/or connected so that the cross-sections of each of the portions 102, 104 are substantially concentric, wherein a center, or longitudinal, axis running through the center of the tubular tail portion 104 also runs through the center of the head portion 102. In yet other embodiments, the center of the head portion 102 need not be concentric with the center of the tail portion 104, such as in circumstances where it is desired that the device 100 performs non-uniform rotational patterns on a fishing line during use. Moreover, the one or more lumens within the device 100 may vary in diameter and/or in shape (such as being tapered).

In certain embodiments, the device 100 has a weight of approximately 0.02 ounces and a length of approximately 3.5 inches (i.e., along the length of the lumen 118 from the distal end 108 to the second end 116). The cylindrical head portion 102 has a diameter of approximately 0.5 inches and a length of approximately 0.5 inches, and the tail portion 104 has a diameter of approximately 0.15 inches and a length of approximately three inches. The lumen 118 has a diameter of approximately 0.092 inches.

In other embodiments, the device 100 has a length of between approximately two inches and approximately four inches, or even between approximately one inch and approximately five inches, with the head portion 102 having a length of between approximately 0.25 inches and approximately 0.75 inches and the tail portion 104 having a length of between approximately 0.25 inches and approximately 4.75 inches. In such embodiments, the head portion 102 further comprises a diameter of between approximately 0.25 inches and approximately 0.75 inches and the tail portion 104 comprises a diameter of between approximately 0.125 inches and 0.175 inches. Moreover, the diameter of the lumen 118 is between approximately 0.075 inches and approximately 0.125 inches. In certain embodiments, the device 100 can weigh between approximately 0.01 ounces and approximately 0.16 ounces. In yet other embodiments, the device 100 can weigh more than 0.16 ounces, and/or the head portion can exceed a diameter or length of 0.75 inches.

Although described for illustration purposes as two portions, in certain preferred embodiments, the head and tail portions 102, 104 are formed of a single, unitary (continuous) material. Such embodiments provide for simplification in manufacturing by allowing for the device 100 to be formed via a single mold. In certain preferred embodiments, the device 100 is created though injection molding, such as via clear plastic injection molding or a like process. In other embodiments, the device 100 can comprise of, and/or consist of, one or more of the following compounds or materials: high-viscosity polycarbonate, polymer (e.g., non-porous), synthetics, composites, plastics (ABS plastics), resin (UV resistant, acrylic resin), wood, metal, stone, fiber, cloth, lead, carbon, fiber, glass, foam, combinations of the same and the like. In certain preferred embodiments, the device 100 is constructed and/or formed of a rigid, opaque material and/or a material that luminesces in the water.

In yet other embodiments, the head and tail portions 102, 104 consist of different materials and/or are made via different molds to be attached together using glue, epoxy, heat treatments, fasteners and/or other methods of securing the two portions.

In yet further embodiments, the surfaces of the head and tail portions 102, 104 may be grooved, notched or otherwise altered in order to produce a particular movement pattern and/or look while traveling through the water during fishing. In yet other embodiments, the tail portion 104 can be notched along the length thereof or otherwise configured to be readily broken, cut or shortened by a user to achieve a desired length.

FIG. 1B further illustrates a side view of the fishing tackle device 100 of FIG. 1A. In particular, the device 100 is shown with the tail portion 104 extending from the head portion 102, the head portion 102 having a longitudinal length substantially equal to its diameter. In yet other embodiments, however, the head portion 102 may have lengths and diameters of different sizes or ratios.

FIG. 1C illustrates a bottom plan view of the fishing tackle device 100 of FIG. 1A. In particular, the lumen 118 is shown extending through the device 100 through central axes of the tail portion 104 and the head portion 102.

Although the fishing tackle device 100 depicted in FIGS. 1A through 1C has been described with reference to particular embodiments, it will be understood from the disclosure herein that the device 100 can take on alternative configurations and/or designs adapted to achieve various results while fishing. For example, in other embodiments, the head portion 102 and/or tail portion 104 can be produced in any color combination by use of, but not limited to paints, pigments, attachments or other processes. In addition, the tail portion 104 may be produced in any variation of length, shape and/or diameter. The tackle devices can also be manufactured with foam, weights, artificial "eyes," combinations of the same or the like, attached thereto and/or integrated within and designed to imitate the look and feel of a fly, fish or other insect.

In yet other embodiments, the head and/or tail portions of a tackle device may be constructed to have different shapes and/or sizes to achieve different motion patterns through the water and take on different appearances, speeds, actions, combinations of the same or the like, during fishing.

In particular, FIGS. 2A through 6C illustrate various views of other embodiments of fishing tackle devices similar to the device 100 of FIG. 1A and which may have similar densities and/or other features as the tackle device 100. To simplify the present description, functions and specifications of elements will not be redescribed in detail if they are previously described herein. Rather, the similar elements in the embodiments of FIGS. 2A through 6C will be given a reference numeral that retains the same last two digits as the corresponding reference numeral used in the embodiment of FIG. 1A and will be preceded with the numeral of the subject drawing (e.g., element 204 will be the element in FIG. 2A that corresponds to element 104 of FIG. 1A).

FIG. 2A illustrates a perspective view of another embodiment of a fishing tackle device 200 having a domed head portion 202. In particular, the domed head portion 202 is permanently joined, fused or connected to a tail portion 204 such that the fishing tackle device 200 is formed of a single, continuous piece of material. Moreover, a lumen 218 extends the length of the device 200, through both the domed head portion 202 and the tail portion 204.

FIG. 2B illustrates a bottom plan view of the fishing tackle device 200 of FIG. 2A, wherein the lumen 218 is shown extending through a central axis of both the domed head portion 202 and the tail portion 204.

Figure 2C:
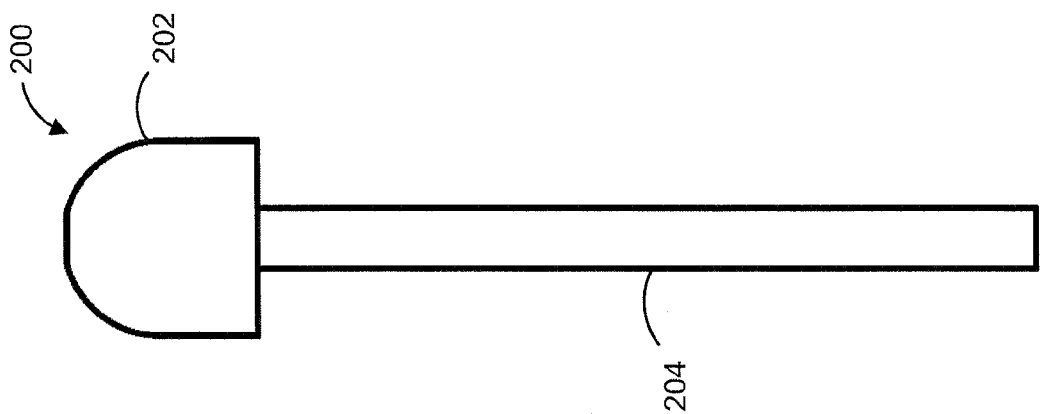
FIG. 2C illustrates a side view of the fishing tackle device of FIG. 2A.

FIG. 2C illustrates a side view of the fishing tackle device 200 of FIG. 2A wherein the tail portion 204 is coupled to the head portion 202. In certain embodiments, the head portion 202 comprises multiple segments, such as a domed segment coupled to a cylindrical segment situated between the domed segment and the tail portion 204. As suggested above, the device 200 can be manufactured such that different segments of the device 200 are made of different materials (e.g., cylindrical and dome-shaped segments) or, advantageously, a single, unitary material. Moreover, one or more of the cylindrical and dome-shaped segments can be hollow, solid and/or have holes distributed therein.

FIG. 2D illustrates a longitudinal cross-sectional view of an embodiment of the fishing tackle device 200 of FIG. 2A. As shown, the head portion 202 is coupled to the tail portion 204 with the lumen 218 extending entirely therethrough. In the depicted embodiment, the domed head portion 202 further includes cavities 220a and 220b located on the bottom side of the head portion 202 facing the tail portion 204. In certain embodiments, the cavities 220a, 220b represent notches in the head portion 202. In yet other embodiments, the cavities 220a, 220b represent a continuous groove, within the underside of the head portion 202, that encircles the tail portion 204. In certain embodiments, the cavities 220a, 220b are created in the head portion 202 to allow for variation in the motion of the device 200 while being fished in the water.

FIG. 2E illustrates a longitudinal cross-sectional view of a fishing tackle device 200a. The device 200a is identical to the fishing tackle device 200 except that a tail portion 204a of the device 200a has a tapered end 208. In certain embodiments, a diameter of the tail portion 204a immediately prior to the tapered end 208 is approximately two percent (2%) less than a diameter of an opposite proximate end 210 of the tail portion (e.g., at a point adjacent the head portion). In yet other embodiments, the difference in diameters can range up to fifteen percent (15%), such as from approximately one percent (1%) to five percent (5%).

In certain embodiments, the outside surface of the tapered end 208 forms an angle, referred to herein as a taper angle, of approximately fifteen degrees) (15°) with an axis extending longitudinally through the tail portion 204a. In yet other embodiments, the taper can be distributed across the entire length, or partial length, of the tail portion 204a such that the taper angle is less than or greater than fifteen degrees (15°). For example, the taper angle can range from approximately five degrees (5°) to approximately twenty-five degrees (25°) or from approximately one degree (1°) to approximately forty-five degrees (45°). In yet other embodiments, a tackle device may be formed without draft and/or a tapered end.

In certain embodiments, the draft of the tail portion 204a and/or the tapered end 208 results from incorporating draft in an injection molding of the device 200a and facilitates removal of the device 200a from the mold. Moreover, in use, the draft of the tail portion 204a and/or tapered end 208 provides for an improved fishing experience by enabling the device 200a to more easily release (up the line) from a junction tube, hook sleeve, fishing hook or like component when catching a fish. This improved design and function advantageously extends the life of the device since it avoids being swallowed and/or directly contacting the fish.

FIG. 3A illustrates a perspective view of another embodiment of a fishing tackle device 300. Similar to the device 100 of FIG. 1A, the fishing tackle device 300 includes a head portion 302, a tail portion 304 and a lumen 318 extending longitudinally therethrough. The head portion 302 is substantially cylindrical in shape.

As further illustrated by the side view in FIG. 3B, an end 316 of the head portion 302 opposite the tail portion 304 includes a concave carve-out 324 that is connected to an end of the lumen 318, which extends through the tail portion 304. In particular, as illustrated by dashed lines, the device 300 is substantially void of material within the lumen 318 and the carve-out 324 such that, during use, a fishing line and water can occupy the lumen 318 and carve-out 324. In certain embodiments, the carve-out 324 affects the overall movement of the device 300. For instance, varying the curvature and/or depth of the carve-out 324 can produce different movements, motions and/or appearances of the device 300 in the water while the device 300 is being fished.

Figure 4B:
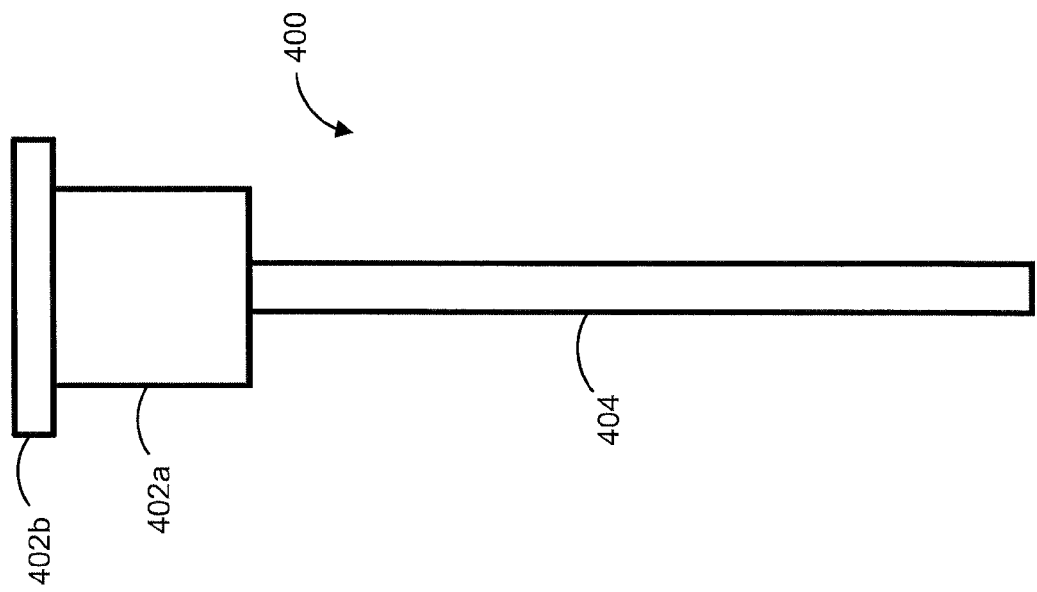
FIG. 4B illustrates a side view of the fishing tackle device of FIG. 4A.
Figure 4A:
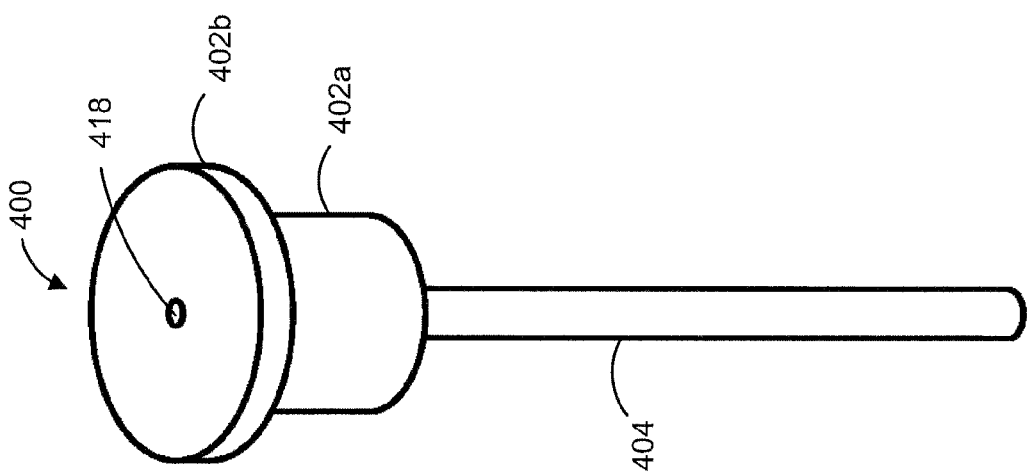
FIG. 4A illustrates a perspective view of another embodiment of a fishing tackle device.

FIG. 4A illustrates a perspective view of another embodiment of a fishing tackle device 400. The device 400 is similar to the device 100 depicted in FIG. 1A but has a further modified head designed to provide alternative movements due to the variation in size and/or shape of said device 400. In particular, the fishing tackle device 400 includes a first head segment 402a with a substantially cylindrical shape that is permanently joined, fused or connected to a tail portion 404. A second head segment 402b, also having a substantially cylindrical shape, albeit a shorter longitudinal length and a larger diameter than the first head segment 402a, is permanently joined, fused or connected to the first head segment 402a, such that the entirety of the device 400 is formed of a single, unitary piece of material. A lumen 418 further extends the length of the device 400.

FIG. 4B illustrates a side view of the fishing tackle device 400 of FIG. 4A, wherein the tail portion 404 is joined to the first head portion 402a, which is, in turn, joined to the second head portion 402b. As suggested above, the device 400 can be manufactured such that different segments 402a, 402b are made of different materials or constructed or formed as a single, continuous material. Moreover, one or more of the cylindrical segments can be substantially hollow or solid.

Figure 5B:
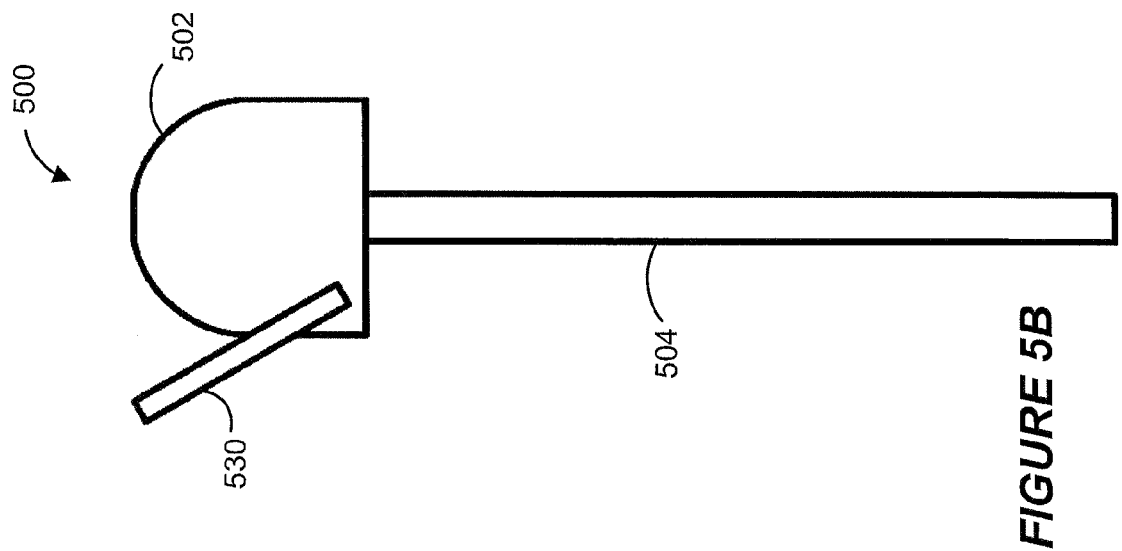
FIG. 5B illustrates a side view of the fishing tackle device of FIG. 5A.
Figure 5A:
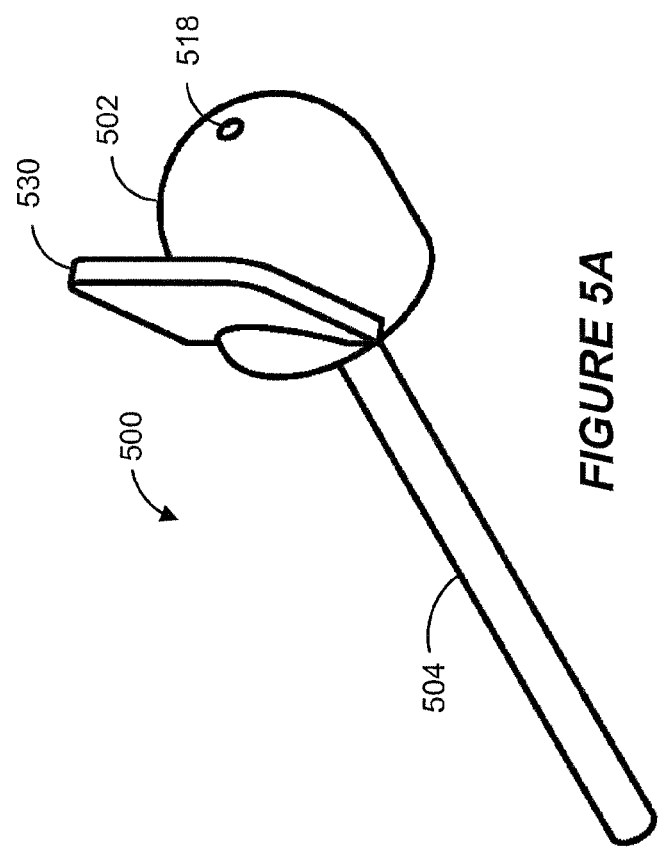
FIG. 5A illustrates a perspective view of another embodiment of a fishing tackle device additionally having a fin.

FIG. 5A illustrates a perspective view of another embodiment of a fishing tackle device 500 having a protrusion extending from a head portion 502 so as to approximate the movement of an insect while being fished. In particular, the device 500 includes a dome-shaped head portion 502 joined with a tail portion 504, similar to the device 200 of FIG. 2A. A lumen 518 extends the length of the device 500 through both the domed head portion 502 and the tail portion 504.

As also shown, attached to the head portion 502 is a bill, or fin, 530 comprising a substantially flat segment protruding out at an angle from the head portion 502. In certain preferred embodiments, the bill 530 forms about a thirty-four degree (34°) angle with the outside surface of the head portion 502, the bill 530 extending away from the tail portion 504. The bill 530 can also have a thickness, in certain embodiments, of approximately 0.0625 inches.

The bill 530 is designed, in certain embodiments, to create disturbances or turbulence while moving in the water during fishing, imitating disturbances or turbulence caused by flies or other insects. Those skilled in the art will recognize from the disclosure herein that the bill 530 may, in other embodiments, be angled differently with respect to the head portion 502, for instance, at approximately a forty-five degree (45°) angle or any angle between zero degrees) (0°) and one-hundred eighty degrees (180°). In yet other embodiments, one or more bills 530 may be attached to the head portion 502 and/or the tail portion 504. Bill(s) 530 may also take on different shapes and sizes, such as having a curved and/or wavy surface, to create different types of water disturbances.

FIG. 5B illustrates a side view of the fishing tackle device 500 of FIG. 5A. In particular, the view shows the bill 530 protruding from the head portion 502 away from the tail portion 504. Although the various elements appear as distinct portions, as discussed above, the device 500 can be advantageously formed of a unitary piece of material, such as created as a single piece via injection molding.

FIG. 5C illustrates a rear view of the fishing tackle device 500 of FIG. 5A with the above-described head portion 502, tail portion 504 and bill 530. FIG. 5D illustrates a top plan view of the fishing tackle device 500 of FIG. 5A. This view shows the bill 530 as having a width substantially equal to the diameter of the head portion 502 transverse to the lumen 518. In yet other embodiments, the bill 530 may have a width shorter or longer than the diameter of the head portion 502.

Although the bill 530 has been described with reference to particular embodiments, those skilled in the art will recognize from the disclosure herein that the bill 530 can be used with various other fishing tackle devices, including the other embodiments disclosed herein.

Figure 6C:
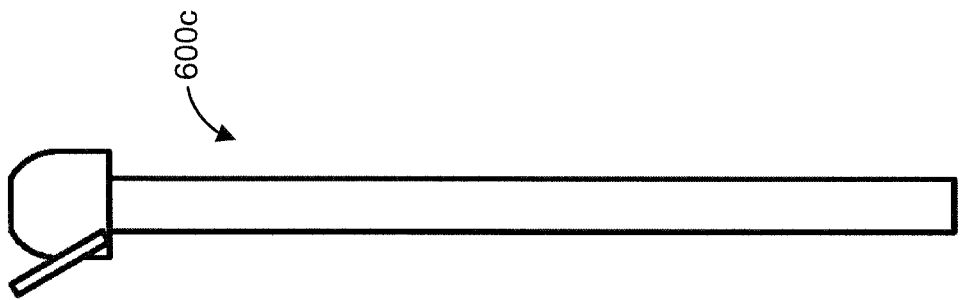
FIGS. 6A to 6C illustrate alternative embodiments of the fishing tackle devices of FIGS. 2A, 4A and 5A, respectively.
Figure 6B:
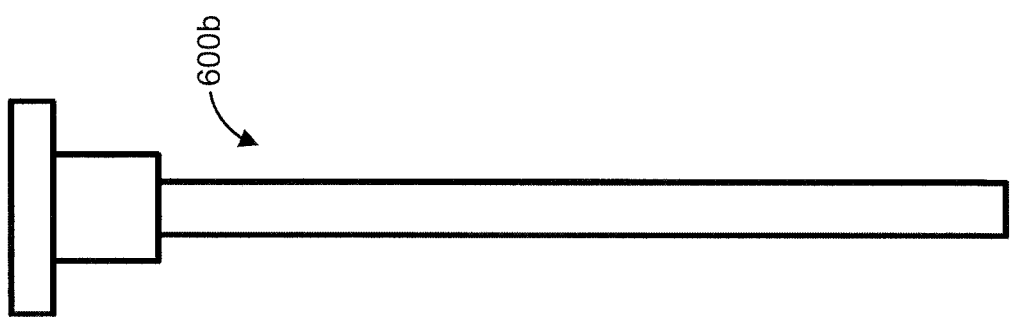
Figure 6A:
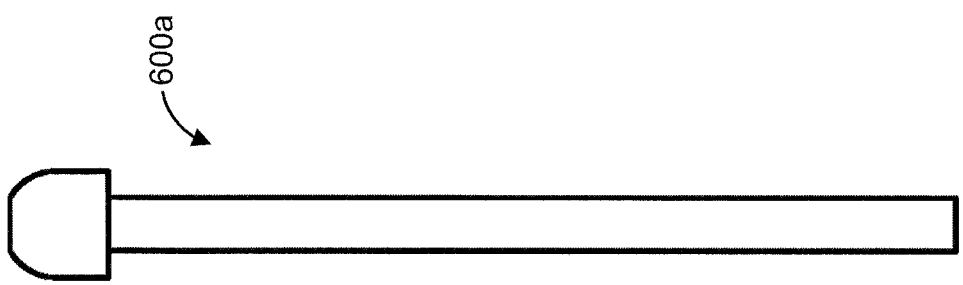

FIGS. 6A to 6C illustrate side views of alternative embodiments of the fishing tackle devices 200, 400 and 500, respectively, of FIGS. 2A, 4A and 5A. In particular, FIG. 6A illustrates a fishing tackle device 600a having a larger tail-to-head size ratio in comparison to that of the fishing tackle device 200. FIG. 6B illustrates a fishing tackle device 600b having a larger tail-to-head size ratio in comparison to that of the fishing tackle device 400, and FIG. 6C illustrates a fishing tackle device 600c having a larger tail-to-head size ratio in comparison to that of the fishing tackle device 500.

A skilled artisan will recognize from the disclosure herein a wide variety of other fishing tackle devices that may be used with embodiments of the invention. For instance, features from an embodiment depicted in one of the drawings can be combined with features of an embodiment depicted in a separate drawing. For example, as described, the bill 530 depicted in FIGS. 5A to 5D may be included with any of the devices depicted in FIGS. 1A to 4B. In yet other embodiments, fishing tackle devices can be designed with various other shapes and/or dimensions, such as conical, round, oval, square, triangular, combinations of the same or like shapes.

Moreover, any of the disclosed tackle devices may have draft incorporated therein such that one end of its elongated tail portion has a smaller circumference (or diameter) than that of the opposing end of the elongated tail portion. Moreover, head portions may be manufactured to be solid, hollow, semi-solid or the like. For instance, one or more holes or conduits can be drilled though the head portions such that when the fishing tackle device is run through the water it creates a turbulence particularly attractive to certain fish.

FIG. 7A illustrates a perspective, exploded view of a fishing tackle assembly 700 according to certain embodiments of the invention. As shown, the fishing tackle assembly 700 differs from the previously-described tackle devices in that a head component 702 of the tackle assembly 700 is removable from a tail component 704. This advantageously allows for one or more head components to be interchangeable with one or more tail components and provide a fisherman with a variety of fishing options.

As shown, the tail component 704 includes a substantially elongated tube 705 having a distal end 708 and a proximal end 710, which is further joined to a connector 740. A lumen 718 extends the length of the assembly 700. In the illustrated embodiments, the connector 740 comprises a substantially cylindrical body 742 having a diameter that is larger than the diameter of the elongated tube 705 and a length that is substantially shorter than the length of the elongated tube 705.

The connector 740 is advantageously configured to engage with the head component 702 so as to form a single assembly. In particular, the connector 740 includes two knobs 744a, 744b that protrude radially from the cylindrical body 742 in opposite directions (e.g., transverse an axis extending through the body 742). The knobs 744a, 744b are advantageously configured and sized to fit within recesses 746a and 746b of the head component 702 and to slide within a groove 748 such that the head component 702 is configured to engage the tail component 704 via a twist locking function. For instance, in certain embodiments, the groove 748 has a spiral design in order to engage the knobs 744a, 744b.

FIG. 7B illustrates a side view of the fishing tackle assembly 700 of FIG. 7A showing the head component 702 engaged with the tail component 704. An upper lip of the connector 740 is visible extending out of the head component 702. As described above, in certain embodiments, one engages the head component 702 and the tail component 704 by inserting the connector 740 into a base of the head component 702 and twisting the head component 702 in a clockwise direction relative to the tail component 704.

Figure 7D:
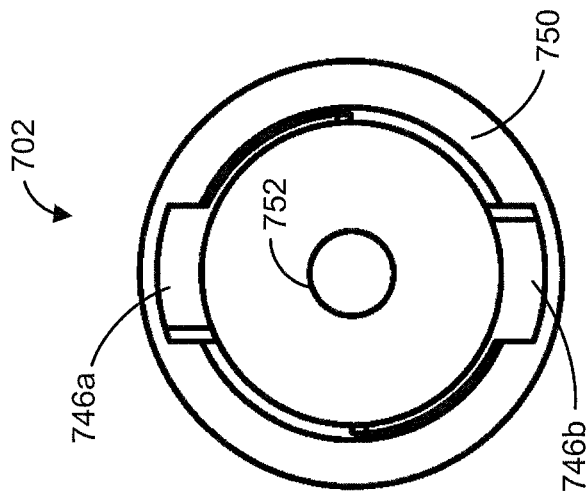
FIG. 7D illustrates a bottom plan view of the head portion of FIG. 7C.
Figure 7C:
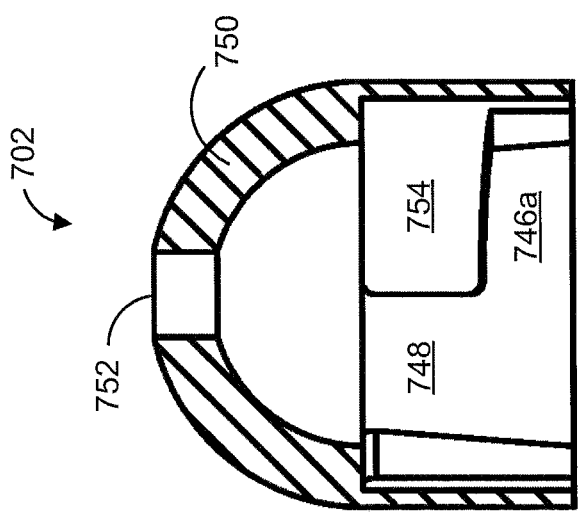
FIG. 7C illustrates a side cross-sectional view of an embodiment of a head portion of the fishing tackle assembly of FIG. 7A.

FIG. 7C illustrates a side cross-sectional view showing further details of an embodiment of the head component 702 of the fishing tackle assembly 700 of FIG. 7A. The head component 702 comprises a substantially dome-shaped outer-body or shell 750 having an aperture, or orifice, 752 at the peak of the dome. In use, the aperture 752 is advantageously aligned with the lumen 718 of an associated tail component such that a fishing line is capable of being threaded through the lumen 718 and the aperture 752 while fishing (and when the head component 702 and associated tail component 704 are engaged). Such a configuration allows the assembly 700 to move freely along a fishing line during use.

Within the shell 750 of the head component 702 are the recess 746a and the groove 748 that are configured to receive a corresponding knob or like protrusion of a tail component, as described above. In particular, as a knob is inserted into the recess 746a and follows the groove 748 (e.g., during rotation of the head component 702 and/or a tail component), a lip 754 of the head component 702 secures in place the knob and, in turn, the tail component.

FIG. 7D illustrates a bottom plan view of the head component 702 of FIG. 7C. This particular view illustrates positions of the recesses 746a, 746b within a bottom portion of the shell body 750. The aperture 752 is further shown as being substantially centered within a top portion of the body 750.

FIG. 7E illustrates a side view of an embodiment of the tail component 704 of the fishing tackle assembly 700 of FIG. 7A. As shown, the tail component 704 includes the elongated tube 705 joined to the connector 740, which further includes knobs 744a, 744b. FIG. 7F further illustrates a side cross-sectional view of an embodiment of the tail component 704 of FIG. 7E, including the lumen 718 extending the length of the tail component 704.

Although the fishing tackle assembly 700 has been described with reference to particular embodiments, a skilled artisan will recognize from the disclosure herein alternative configurations and/or shapes within the scope of the inventions. For instance, in other embodiments, the head component 702 may be configured to snap on to the tail component 704, or the assembly 700 may have an alternative coupling configuration that allows for the joining and/or separation of the head component 702 and the tail component 704. In yet other embodiments, the head component 702 may take on different shapes and/or configurations, such as those described above (e.g., draft).

Figure 8B:
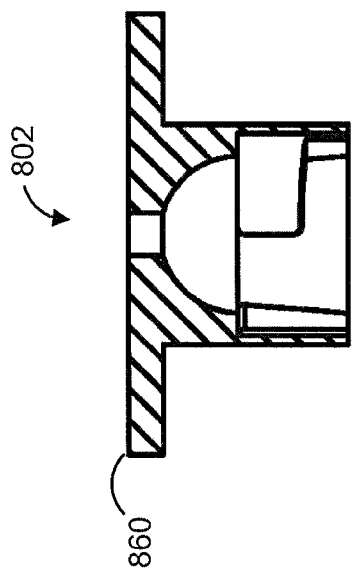
FIG. 8B illustrates a bottom plan view of the head portion of FIG. 8A.
Figure 8C:
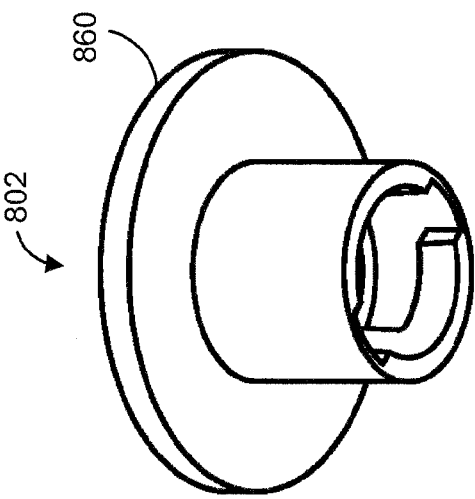
FIG. 8C illustrates a side cross-sectional view of the head portion of FIG. 8A.
Figure 8A:
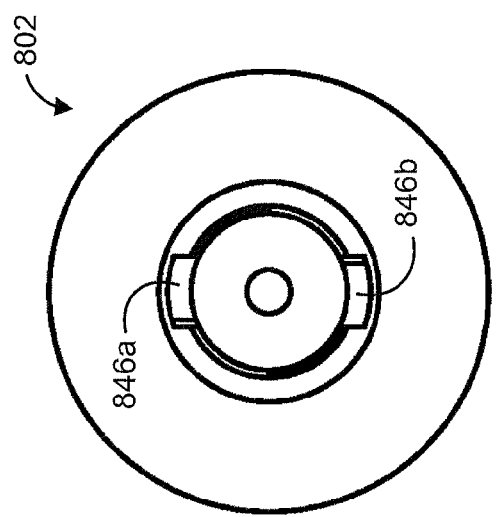
FIG. 8A illustrates a perspective view of another embodiment of a head portion usable with the tail portion of FIG. 7E.

For example, FIGS. 8A to 8C illustrate a head component 802 similar in shape to the head portion 402 of FIG. 4 that is interchangeable with the head component 702 in the fishing tackle assembly 700 of FIG. 7A. In particular, FIG. 8A illustrates a perspective view of the head component 802, which includes recesses 846a and 846b configured to receive the tail component 704 or a like component in the same manner as the head component 702.

FIGS. 8B and 8C illustrate, respectively, a bottom plan view and a side cross-sectional view of the head component 802 of FIG. 8A. As shown, the head component 802 includes a top 860 that has a substantially larger diameter than the remainder of the head component body.

Where the context permits, words in this disclosure using the singular or plural number may also include the plural or singular number respectively. The word "or" in reference to a list of two or more items, that word covers all of the following interpretations of the word: any of the items in the list, all of the items in the list, and any combination of the items in the list.

While certain embodiments of the inventions have been described, these embodiments have been presented by way of example only, and are not intended to limit the scope of the disclosure. Indeed, the novel devices, assemblies and methods described herein may be embodied in a variety of other forms; furthermore, various omissions, substitutions and changes in the form of the novel devices, assemblies and methods described herein may be made without departing from the spirit of the disclosure. The accompanying claims and their equivalents are intended to cover such forms or modifications as would fall within the scope and spirit of the disclosure.

What is claimed is:

1. An artificial fly device comprising:
   an elongated tubular tail portion comprising,
      a proximal end,
      a distal end, and
      an outside surface having a substantially circular first cross-section with a first diameter;

a head portion having a first end permanently joined with the proximal end of said tail portion, the head portion further comprising,
a second end opposite said first end, and
an outside surface having a substantially circular second cross-section with a second diameter, the second diameter being longer than the first diameter of said first cross-section; and
a lumen configured to receive a fishing line and substantially centered in the head and tail portions and extending longitudinally from the distal end of said tail portion to the second end of said head portion, the lumen having a length of between one inch and five inches,
wherein both the head portion and the tail portion are free from any hooks affixed thereto and the device consists entirely of a single polycarbonate material,
wherein the head portion is substantially dome-shaped and includes cavities at the first end of the head portion.

2. The artificial fly device of claim 1, wherein the distal end of said tail portion is tapered.

3. The artificial fly device of claim 1, wherein the cavities comprise notches at the first end of the head portion.

4. A fishing tackle device comprising:
an elongated tail portion comprising,
a proximal end having a first diameter, and
a distal end having a second diameter, the second diameter being shorter than the first diameter;
a head portion having a first end permanently fused with the proximal end of said tail portion, wherein the head portion has a substantially circular cross-section with a third diameter, the third diameter being at least twice as long as the first diameter; and
a cylindrical lumen substantially centered in the head portion and the tail portion and extending longitudinally through the head portion and the tail portion and configured to receive a fishing line therethrough,
wherein the tail and head portions are formed entirely of a single non-porous polymer material,
wherein the head portion further includes a plurality of cavities on the first end of said head portion.

5. The fishing tackle device of claim 4, wherein the non-porous polymer material comprises a rigid material.

6. The fishing tackle device of claim 5, wherein the non-porous polymer material comprises a high-viscosity polycarbonate.

7. The fishing tackle device of claim 4, wherein the lumen has a diameter of between 0.075 inches and 0.125 inches.

8. The fishing tackle device of claim 4, wherein the first diameter of said proximal end is no more than fifteen percent longer than the second diameter of said distal end of the elongated tail portion.

9. The fishing tackle device of claim 8, wherein the first diameter of said proximal end is no more than five percent longer than the second diameter of said distal end of the elongated tail portion.

10. The fishing tackle device of claim 4, wherein the distal end of said elongated tail portion is tapered.

11. The fishing tackle device of claim 10, wherein the tapered distal end comprises a taper angle of between five degrees and twenty-five degrees.

12. A hookless artificial fishing device comprising:
an elongated tail portion comprising,
a proximal end, and
a distal end;
a head portion having a first end connected to the proximal end of said tail portion, wherein the head portion has a substantially circular cross-section and further includes a plurality of cavities on the first end of said head portion; and
a cylindrical lumen configured to receive a fishing line therethrough and substantially centered in the head portion and the tail portion and extending longitudinally through the head portion and the tail portion,
wherein the tail and head portions consist only and entirely of a single, rigid plastic material.

13. The hookless artificial fishing device of claim 12, wherein:
the lumen further comprises,
a length between two inches and four inches, and
a diameter between 0.075 inches and 0.125 inches; and
the fishing device has a weight between 0.01 ounces and 0.16 ounces.

14. The hookless artificial fishing device of claim 13, wherein the diameter of the lumen remains substantially the same through said head and tail portions.

15. The hookless artificial fishing device of claim 12, wherein the head portion is substantially dome-shaped.

16. The hookless artificial fishing device of claim 12, wherein the tail portion is tapered.

17. The fishing tackle device of claim 4, wherein the plurality of cavities extend longitudinally through at least half the length of the head portion.

* * * * *